Aug. 11, 1970  R. F. CROZIER  3,523,627
ELECTRONIC FUEL DISPENSING METER
Filed May 9, 1968  2 Sheets-Sheet 1

INVENTOR.
ROBERT F. CROZIER
BY
ATTORNEY

United States Patent Office 3,523,627
Patented Aug. 11, 1970

3,523,627
ELECTRONIC FUEL DISPENSING METER
Robert F. Crozier, 624 Pennsylvania Ave.,
Denver, Colo. 80204
Filed May 9, 1968, Ser. No. 727,826
Int. Cl. B67d 5/30; G01f 1/00
U.S. Cl. 222—20                                    7 Claims

ABSTRACT OF THE DISCLOSURE

Automatic control for fluid dispensing apparatus, such as a gasoline pump, having a pulse generator coupled to the pump generating pulses indicative of the amount of fluid being dispensed. The apparatus has a pulse counter coupled to the pulse generator display for showing the number of pulses in the counter, an indicator indicating a predetermined number of pulses, and a comparator for comparing that predetermined number with the number of pulses coming from the pulse generator. A switch is connected to the comparator which turns off the pump valve when the proper number of pulses has been counted.

---

Figure 1:
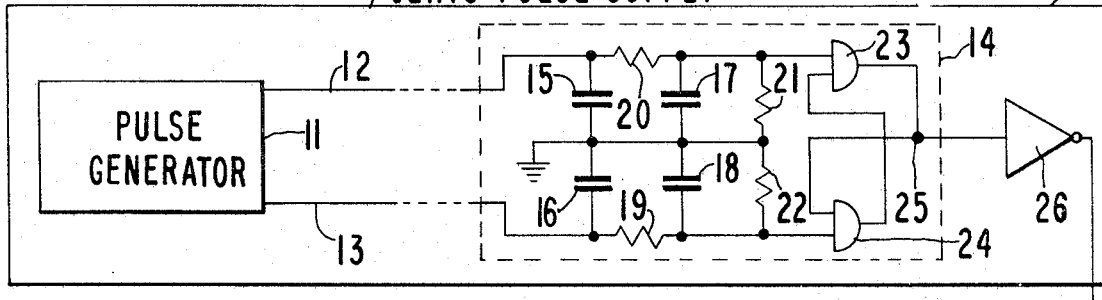
Figure 1:
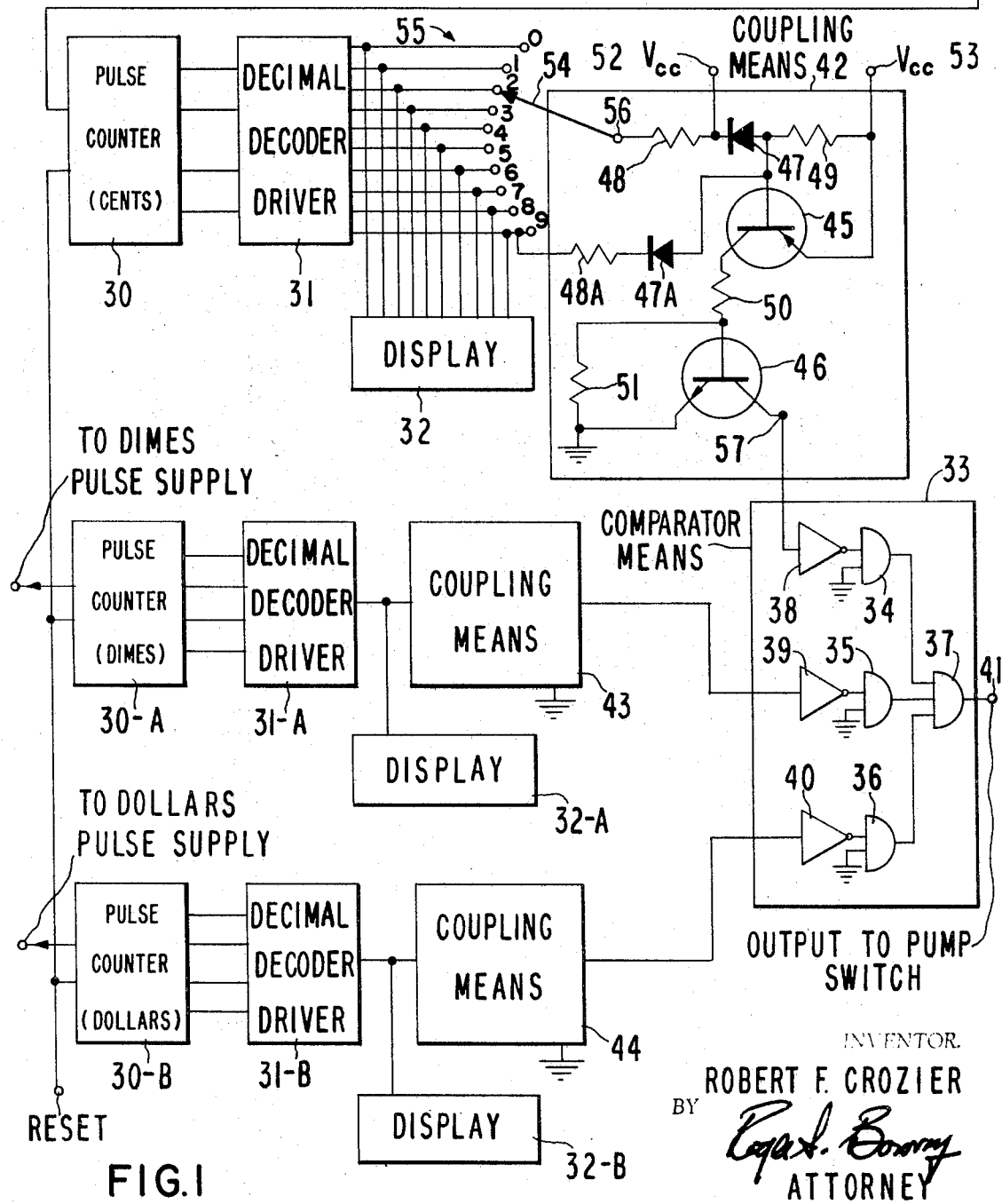

The subject invention relates to an automatic control for fluid dispensing apparatus. Such automatic controls, for example, for gasoline pumps, are no uncommon. Representative types of prior art controls are shown in U.S. Pats. 3,211,332 and 3,353,710. Both of these patents describe electromechanical devices for controlling the dispensing of liquids. U.S. Pat. 3,278,082, issued on Oct. 11, 1966, describes a transistorized unit accomplishing essentially the same results as the electromechanical devices of the above-mentioned two patents. These systems of the prior art have several serious disadvantages. Using the transistorized unit of U.S. Pat. 3,278,082 as an example, the first disadvantage is spurious pulses on the line coming from the counter or "Pulsing Meter" as it is termed by the patentees. The patentees, Thielen et al., used standard circuitry for transmitting their pulses from the pulsing meter to the transistor circuit boards. Such circuitry was described as using ground or standard as a return. Thus, the pulses from the pulsing meter are always the same polarity—either positive or negative—differing from ground or standard. In practice, this system of pulsing has resulted in spurious pulses being passed which cause inaccuracies in the count. Similar inaccuracies are caused by the lack of adequate pulse-conditioning of the pulses prior to the transmission.

Another disadvantage of the system of the prior art exemplified by Thielen et al. is the requirement of a relay switch to turn off the pump when proper amount of fluid has been dispensed. This relay switch not only is an unreliable device, but also can cause a spark which, in the case of combustible fluids, can be quite dangerous.

The system of the subject invention employs a substantially different transmission system of pulses which are properly conditioned so that spurious pulses are virtually eliminated. In addition, the system of the subject invention eliminates the relay switch and thus avoids the inherent unreliability and the danger of sparking. Finally, in addition to overcoming the deficiencies of the prior art, the system of the subject invention uses the latest types of microcircuitry and includes certain novel combinations of conventional microcircuits.

Briefly, the automatic control system of the subject invention comprises: a pulse generator for supplying a chain of electrical pulses, each denoting one unit of fluid dispensed from the apparatus, each successive pulse being of opposite polarity from its predecessor, the pulse generator being located in close proximity with the dispensing apparatus; a pulse counter coupled to the pulse generator for counting the number of pulses in the pulse chain; an indicator for indicating a predetermined number of pulses; a comparator for continually comparing the number of pulses of the pulse chain with the predetermined number; and finally a switch coupled to the comparator for turning off the fluid dispensing apparatus when the comparator indicates that the number of pulses in the pulse chain has reached the predetermined number.

Figure 2:
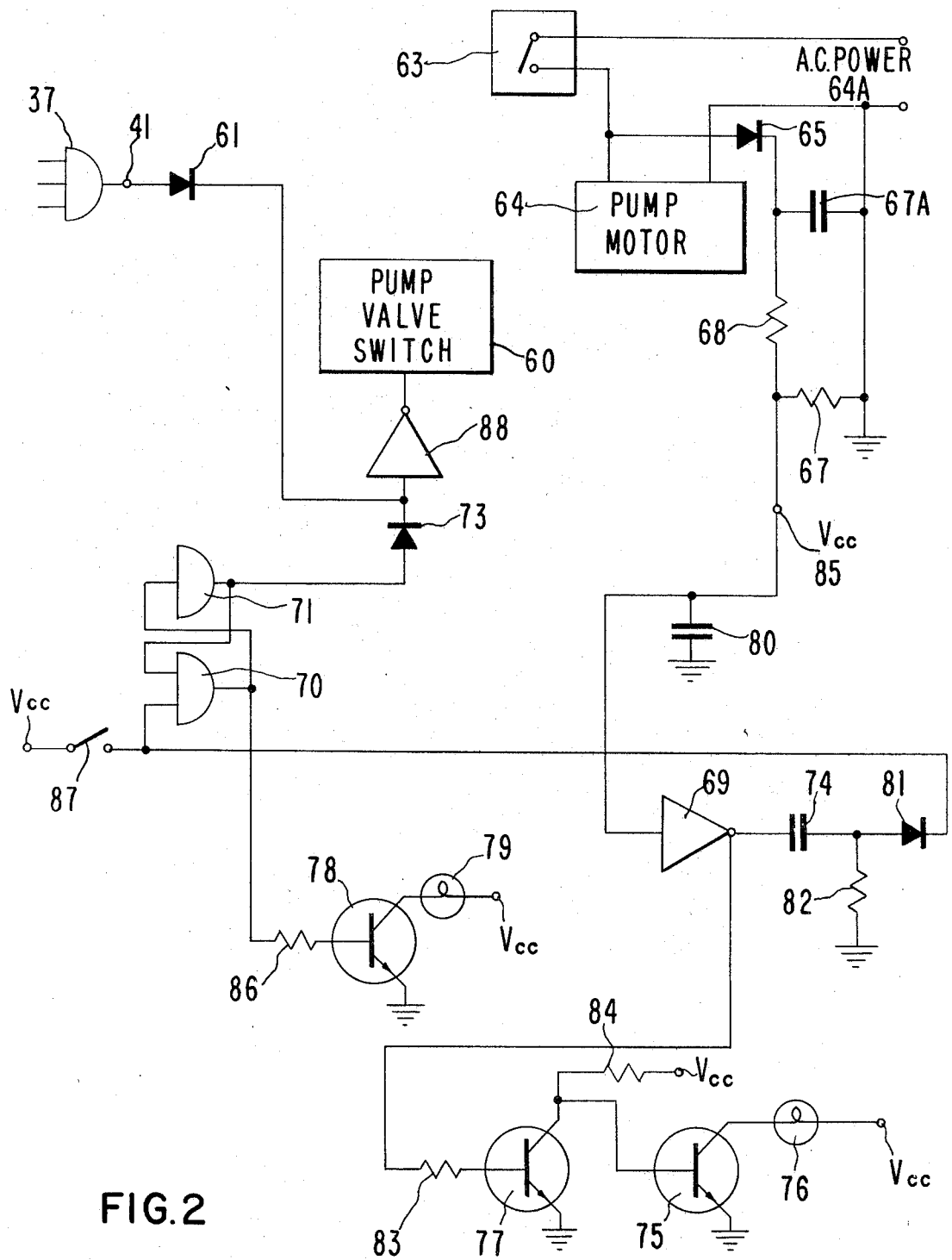

The apparatus of the invention will be better understood from the detailed description which follows, making reference to the drawings, in which:

FIG. 1 is a somewhat schematic block diagram of the apparatus of the subject invention; and FIG. 2 is a somewhat schematic block diagram of the pump turn-off mechanism of the subject invention.

Referring to the drawings, and in particular to FIG. 1, the apparatus of the subject invention is shown. Only the pulse supply for the "cents" is shown in detail; the pulse supplies for the dimes and the dollars are identical to the cents pulse supply and are eliminated to simplify the drawing. Pulse supply 10 includes a pulse generator 11 for providing a pulse chain, each pulse denoting one unit of fluid being dispensed (in the case of the cents pulse generator, for example, one unit represents each penny's worth of fluid). The successive pulses are each of opposite polarity from their predecessor. Pulse generator 11 is located in close proximity with the dispensing apparatus, such as a gasoline pump (not shown). One type of pulse generator 11 commercially available is manufactured by Metron Corporation. This pulse generator is a transducer mechanically coupled to the shaft of the pump money counter which generates 10 pulses alternately of opposite polarity with each rotation of the shaft.

The pulses from generator 11 are passed through lines 12 and 13 through a pulse-conditioning network 14. Contrary to the prior art, two lines are used for transmission, the first line 12 for positive polarity pulses and the second line 13 for negative polarity pulses.

Pulse-conditioning network 14 includes capacitors 15, 16, 17 and 18 and resistors 19, 20, 21, and 22. At the output end of pulse conditioner 14 are a pair of AND-gates 23 and 24, cross-connected in a conventional manner as a flip-flop having SET and RESET inputs. The alternating opposite polarity pulses on lines 12 and 13 coupled to the SET and RESET inputs as shown in FIG. 1 continually switch the flip-flop circuit from one condition to the other. The signal from the flip-flop at terminal 25 is passed to a conventional buffer circuit 26. The pulses emerging from buffer circuit 26 are passed to a pulse counter, to be described below. The flip-flop circuit may be made, as is well known in the art, from a dual two-input gate, such as μL914 manufactured by Fairchild Semiconductor Division of Fairchild Camera and Instrument Corporation. All buffer circuits described can be Fairchild μL900's.

It is important to realize that the pulse generator is located adjacent the gasoline pump; however, the pulse conditioning network 14 and the buffer circuit 26 are located adjacent the counting and computing apparatus. Thus the single polarity pulses emerging from buffer 26 do not cause spurious noise signals since they are passing only a short distance within the computer. However, the long-distance signals on lines 12 and 13 are alternately opposite polarity in accordance with the invention. Thus these signals, transmitted over the longer distance, are substantially prevented from picking up spurious pulses and noise.

Another important aspect of the invention is the pulse counter and display network. This network is again shown in detail for the cents counter and in block diagram for the dimes and dollars counters. Decade counters 30, 30–A, and 30–B are conventional microcircuits, such as Fairchild CμL9958. Counters 30, 30–A, and 30–B are respectively coupled to a decimal decoder/driver 31, 31–A, and 31–B which may for example, be Fairchild part number CμL9960. Decoders 31, 31–A, and 31–B are coupled in a conventional manner respectively to displays 32, 32–A, and 32–B which may for example be a plurality of Nixie tubes.

Comparator means 33 is a conventional connection of four two-input AND-gates 34, 35, 36, and three-input gate 37. AND-gates 34, 35, and 36 are pulsed through three buffer elements 38, 39, and 40. Upon coincidence of positive signals at the inputs of AND-gates 34, 35, and 36 from the respective cents, dimes, and dollars counters, indicating that the predetermined dollar amount of fluid has been pumped, an output signal will appear at terminal 41 from AND-gate 37. This output signal is passed to the pump valve, as will be discussed later herein.

The novel aspect of the computer of this invention is the unique coupling means for coupling comparator means 33 with decoder 31. In the prior art, the signals from decade counter 30, which are low microcircuit voltages (e.g. 4 volts), are passed to a separate low voltage decoder (not the high voltage type used to drive the Nixie tube display tube 32). Such a low voltage decoder requires thirty-six gates to decode the signal before the signal is in condition for input to comparator means 33. Because of the conventional low voltages employed by integrated circuits, it was not heretofore considered feasible to use the high 170 volt Nixie tube input signals to drive an integrated circuit comparator means 33. Contrary to the prior art, however, the subject invention employs coupling means 42, 43, and 44 which directly couple the high voltage output signal of decoders 31, 31–A, and 31–B with comparator 33. These unique coupling means of this invention shown in detail in coupling means 42, each include p-n-p transistor 45, n-p-n transistor 46 and diode 47. Diode 47 is coupled between power supply 53 (+4 volts) and indicator 54 by means of series resistors 48 and 49. The collector p-n-p transistor 45 is coupled through resistor 50 to the base of n-p-n transistor 46. Biasing resistor 51 is used to bias transistor 46.

When indicating lever 54 is set to one of the digits 0 through 9 at terminal points 55 (in the embodiment illustrated in FIG. 1, indicator 54 is set at the numeral 2) an amount of fluid should be pumped worth that number of units (two cents). Presumably the dimes indicator and dollars indicator also were set at corresponding dime and dollar amounts also to be pumped. Indicator lever 54 thus sets the predetermined number of pulses required to be counted by decade counter 30 for an output signal to result from AND-gate 34 in comparator means 33.

When the requisite two cents' worth of fluid have been pumped, the numeral 2 will be lighted on display means 32 and the voltage at terminal 56 will drop from its previous value of approximately 35–60 volts to ground. With terminal 56 at ground, transistor 45 turns "on" and diode 47 will conduct in the forward direction. With transistor 45 on, transistor 46 is also turned on, bringing the voltage level at its collector (terminal 57) to approximately ground. With collector terminal 57 at ground, buffer element 38 inverts providing a high level input to AND-gate 34, causing AND-gate 34 to have a high level output to AND-gate 37.

Obviously, however, if AND-gates 35 and 36 do not concurrently also have high level outputs to AND-gate 37, AND-gate 37 will not have a high level output at terminal 41. But if all three AND-gates 34, 35, and 36 do have high level inputs, indicating that the predetermined number of pulses corresponding to the number set by indicator 54 as well as the corresponding indicators for the dimes and dollars counters have been counted, then AND-gate 37 will have three high level inputs and comparator 33 will have a high level output at terminal 41. This output is connected to the pump switch.

Also, when $9.99 worth of fluid has been dispensed, it is necessary to turn off the unit. This is accomplished by a signal from the "9" terminal of display 32 which is connected to the base of transistor 45 through resistor 48A and diode 47A, as shown. This signal turns "on" transistors 45 and 46, thus inverting buffer 38. When all 9's are displayed together, a coincidence output appears at terminal 41. The "999" coincidence therefore turns off the unit in exactly the same manner as the coincidence which occurs when the desired amount set on indicator levers 54 has been reached.

Rather than using a conventional sensing relay, as in the prior art, the pump hang-up indicator of this invention uses a different type of transducer to show when the pump hose has been hung up and thus the pump automatically turned off. Referring now to FIG. 2, AND-gate 37 (the same as described with reference to FIG. 1) is shown at the left. Upon counting the predetermined number of pulses, an output signal from AND-gate 37 appears at terminal 41. This signal is passed to pump valve switch 60 through diode 61 and buffer 88. Thus, when the predetermined amount of fluid has been dispensed and the predetermined count therefore been reached, pump valve switch 60 is turned off and no more fluid will be dispensed.

During a fill up, comparator circuit 33 (FIG. 1) is biased out of operation by a positive voltage at terminal 52 (FIG. 1) so pump valve will not shut off at a predetermined amount of money. The $9.99 turnoff is not thereby affected. Should the customer hang up the pump hose, however, and therefore automatically turn off the pump motor prior to filling the tank, the system will still be operating and another person could turn the pump back on and take additional gasoline without being held accountable. Therefore, it is essential that the pump valve be permanently turned off by such a hang-up until reset by the operator.

Hang-up is indicated by the opening of switch 63, disconnecting AC power from pump motor 64 and bringing into operation the unique circuitry of this invention. Power rectifier 65, capacitor 67A and resistors 67 and 68 are located in the proximity of the pump across the AC power supply 54A for motor 64 (120 or 240 AC). While the motor 64 is running a positive DC voltage, such as 6 volts, developed by rectifier 65 will appear at terminal 85. Capacitor 80 filters any line noise. The same positive DC voltage causes buffer 69 to invert, causing transistor 77 to turn off and transistor 75 (and therefore the "ON" light 76) to turn on.

When pump motor 64 is stopped, rectifier 65 shuts off, causing buffer 69 to invert. Transistor 77 is turned on through resistor 83. Transistor 77 is biased by resistor 84. At the same time transistor 75 is turned off as is the "ON" light 76. When buffer 69 inverts, it also sends a pulse through the circuit including capacitor 74, resistor 82 and diode 81, causing flip-flop 70, 71 to change state and apply a positive voltage to buffer 88 through diode 73. This turns off pump valve switch 60. Flip-flop 70, 71 also biases on transistor 78 through resistor 86 and thus turns on "sale complete" lamp 79 so that the operator knows that the pump hose has been hung up and that the pump valve has been locked closed. Once this pump valve switch 60 has been turned off, it cannot later be turned on without the operator resetting the mechanism, thus avoiding an unwarranted user from later taking additional gasoline after the pump is hung up during a "fill" operation.

Switch 87 is a manual emergency stop switch which also serves to trigger the flip-flop 70, 71 to turn off valve switch 60 in the same manner as a "hung-up."

The advantage of rectifier 65 is the elimination of conventional relay sensing devices, such as used in the prior art, which not only can cause dangerous sparks, but suffer from continual contact wear and therefore cause problems of reliability.

For purpose of example, and not limitation, the following is an exemplary list of parts used in one specific embodiment.

Capacitors:
| | |
|---|---|
| 15 | .001 µf. |
| 16 | .001 µf. |
| 17 | .01 µf. |
| 18 | .01 µf. |

Resistors:
| | |
|---|---|
| 19 | 100Ω. |
| 20 | 100Ω. |
| 21 | 1KΩ. |
| 22 | 1KΩ. |
| 48 | 10KΩ. |
| 48A | 10KΩ. |
| 49 | 20KΩ. |
| 50 | 20KΩ. |
| 51 | 10KΩ. |
| 67 | 2.7KΩ. |
| 68 | 56KΩ. |

Capacitors:
| | |
|---|---|
| 67A | 0.5 µf. |
| 74 | 10 µf. |

Transistors:
| | |
|---|---|
| 45 | 2N3638. |
| 46 | 2N3565. |
| 75 | 2N3568. |
| 77 | 2N3568. |
| 78 | 2N3568. |

| | |
|---|---|
| Diodes 47, 47A, 61, 73, 81 | 1N270. |
| Rectifier 65 | 1.5 ma., 400 volts. |
| Capacitor 80 | 300 mfd. |

Resistors:
| | |
|---|---|
| 82 | 10K. |
| 83 | 20K. |
| 84 | 1K. |
| 86 | 180Ω. |

Although a specific preferred embodiment of this invention has been described in detail in connection with the schematic diagrams of FIGS. 1 and 2, it will be apparent to one skilled in the art that many modifications can be made in the circuit without departing from the spirit and scope of the invention. Therefore, the only limitations to be placed on the scope of this invention are those set forth in the claims which follow.

What is claimed is:

1. Automatic control for fluid dispensing apparatus comprising:
   a pulse generator means for supplying a chain of electrical pulses, each denoting one unit of fluid dispensed from said apparatus, each successive pulse being of opposite polarity from its predecessor, said pulse generator being located in the same housing as said dispensing apparatus;
   a pulse counter coupled to said pulse generator, said pulse counter counting the number of pulses in said pulse chain;
   an indicator means for indicating a predetermined number of pulses;
   a comparator means for continually comparing the number of pulses in said pulse chain with said predetermined number of pulses; and
   a switch coupled to said comparator for turning off said fluid dispensing apparatus when said comparator indicates that said number of pulses in said pulse chain has reached said predetermined number.

2. The automatic control apparatus of claim 1 further characterized by the addition of a pulse conditioning network coupled between said pulse generator and said pulse counter, said conditioning network adapted to remove spurious noise from said pulse chain.

3. The automatic control apparatus of claim 2 further characterized by said pulse conditioning network including a flip-flop circuit having SET and RESET inputs, both of said inputs being coupled to said pulse generator, one of said inputs being directly triggered by a pulse in said chain of pulses of the opposite polarity, whereby said flip-flop is switched from one state to another by each successive received pulse.

4. The automatic control apparatus of claim 2 further characterized by said pulse conditioning network including a buffer circuit.

5. The automatic control apparatus of claim 2 further characterized by said pulse conditioning network including an R-C filter.

6. Automatic control for fluid dispensing apparatus comprising:
   a pulse generator means for supplying a chain of electrical pulses, each denoting one unit of fluid dispensed from said apparatus;
   a pulse counter coupled to said pulse generator, said pulse counter counting the number of pulses in said pulse chain;
   a gas discharge tube display means for displaying the count in said pulse counter, the input to said display means being coupled to said pulse counter;
   an indicator means for indicating a predetermined number of pulses;
   a comparator means for continually comparing the number of pulses in said pulse chain with said predetermined number of pulses;
   a coupling means coupling said comparator means to the input of said display means and to said indicator means, said display means providing the electrical signal denoting the count in said pulse counter and said indicator means providing the electrical signal denoting said predetermined number of pulses said coupling means being a pair of cascaded transistors of opposite polarity types, the base of the first transistor being coupled to the input of said display means and to said indicator means, the collector of the first transistor being coupled to the base of the second transistor, and the collector of the second transistor being coupled to said comparator means;
   a switching means coupled to said comparator means for turning off said fluid dispensing apparatus when said comparator means indicates that said number of pulses in said pulse chain has reached said predetermined number.

7. Automatic control for fluid dispensing apparatus comprising:
   a pulse generator means for supplying a chain of electrical pulses, each denoting one unit of fluid dispensed from said apparatus;
   a pulse counter coupled to said pulse generator, said pulse counter counting the number of pulses in said pulse chain;
   a comparator means for continually comparing the number of pulses in said pulse chain with said predetermined number of pulses;
   a first indicator means providing a first signal indicating said predetermined number of pulses has been counted;
   a rectifier in series with the power supply to said motor providing a second signal indicating that the power to the motor of said fluid dispensing apparatus has been turned off; and
   a first valve means coupled to said first indicator means and said rectifier for turning off the fluid supply of said dispensing apparatus upon receipt of said first or second signals.

References Cited

UNITED STATES PATENTS

| | | |
|---|---|---|
| 3,067,936 | 12/1962 | Kasper et al. |
| 3,211,332 | 10/1965 | Thielen _____ 222—20 |
| 3,278,082 | 10/1966 | Thielen et al. _____ 222—20 |
| 3,353,710 | 11/1967 | Romanowski _____ 222—19 |
| 3,386,620 | 6/1968 | Smith _____ 222—20 |
| 3,402,851 | 9/1968 | Ciotti et al. _____ 222—19 |

ROBERT B. REEVES, Primary Examiner